United States Patent [19]

Sceery

[11] Patent Number: 4,950,201
[45] Date of Patent: Aug. 21, 1990

[54] ANIMAL AND BIRD CALL

[76] Inventor: Ed. J. Sceery, 1949 Osage La., Santa Fe, N. Mex. 87501

[21] Appl. No.: 347,872

[22] Filed: May 5, 1989

[51] Int. Cl.$^5$ .......................................... A63H 5/00
[52] U.S. Cl. ................... 446/207; 446/208; 446/397
[58] Field of Search ............... 446/207, 208, 209, 213, 446/206, 205, 204, 203, 202, 397; 273/58 BA

[56] References Cited

U.S. PATENT DOCUMENTS

| 1,576,099 | 3/1926 | Dessau | 446/209 |
| 2,460,716 | 2/1949 | Shurley | 446/208 |
| 2,542,720 | 2/1951 | Soklaski | 446/209 |
| 2,604,731 | 7/1952 | Meucci | 446/208 |
| 2,705,148 | 3/1955 | Waller | 273/58 B X |
| 2,825,180 | 3/1958 | Dieckmann | 446/208 |
| 3,803,755 | 4/1974 | Thompson | 446/209 |
| 4,143,485 | 3/1979 | Stewart | 446/207 |
| 4,335,539 | 6/1982 | Jones | 446/204 |
| 4,761,149 | 8/1988 | Laubach | 446/208 |

FOREIGN PATENT DOCUMENTS 547720 10/1957 Canada ....................... 446/208

Primary Examiner—Robert A. Hafer
Assistant Examiner—D. Neal Muir

[57] ABSTRACT

This invention is a game call for attracting birds and animals. It involves a tube, open at both ends, and a vibratory reed disposed therein. The call is adapted to be held in the hand of the user by the larger of two major parts, the barrel. The second major part, a voice-unit, secures a vibratory reed. Either the barrel or voice-unit may serve as the mouthpiece. The barrel, provided with external ribs, is constructed of a multicolored soft resilient material, preferably rubber but alternatively may be of other resilient natural or synthetic material.

13 Claims, 4 Drawing Sheets

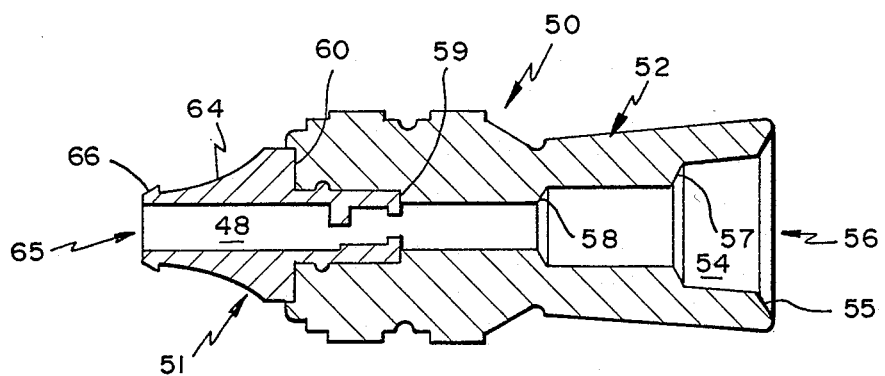
FIG. 9
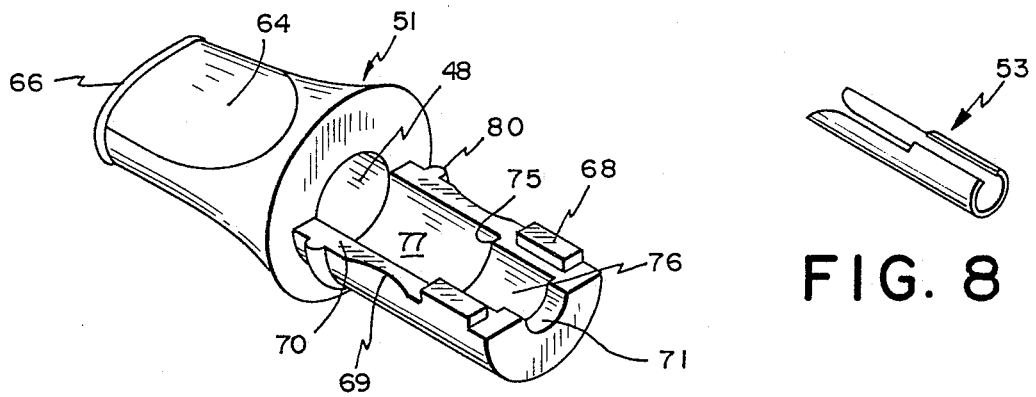
FIG. 10
FIG. 8
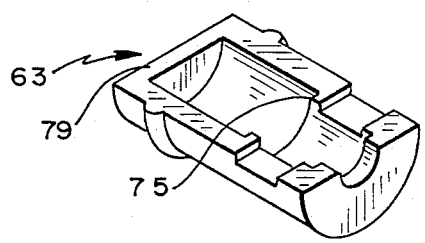
FIG. 12
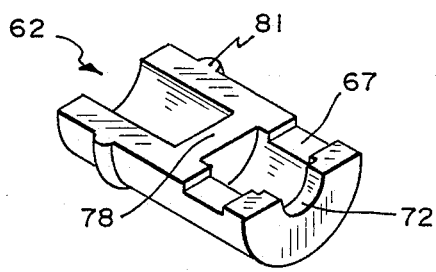
FIG. 11
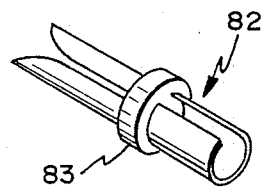
FIG. 13

ANIMAL AND BIRD CALL

FIELD OF INVENTION

This invention relates to a device commonly known as a game call. Similar devices have been utilized for many years by hunters and wildlife photographers for attracting wild birds and animals.

BACKGROUND OF THE INVENTION

The type of game call, or "call", which this invention relates are those generally consisting of one or more elongated tubular body parts aligned axially, open at both ends, and a vibratory reed. The call is held in a hand, usually by its largest part referred to as the barrel, placed against the mouth and a stream of air is blown through the call. This passing air results in vibration of the reed and production of sound waves. A second hand is often placed over the sound exit end to control the sounds emitted from the call. Depending on the orientation of the vibratory reed and the specific sounds desired, one end of the call serves as a mouthpiece, the other for exit of sound waves intended to mimic various birds and animals. Examples of such calls are shown and described in U.S. Pat. Nos. 4,551,112, to Johnson, and U.S. Pat. No. 4,138,800 to Lege.

Calls of similar type have been commonly constructed of relatively rigid materials, such as wood or plastic. There are many limitations inherent to the use of rigid materials in game calls, particularly in call barrels. One major problem has been providing a secure, airtight fit between tubular call parts, yet still providing for ease of disassembly for access to internal call parts. Other problems, well known to those using such rigidly constructed calls, are their cold shiny surface, lack of suitable griping surface, and their tendency to produce a clacking noise when coming in contact with another call or foreign object.

The most common method used to join two or more rigid tubular body parts has been a tapered press or friction-fit. However, as the joint becomes more secure from pressure applied during assembly, the parts become more difficult to separate. In addition, it often results in cracks, especially in thin wooden barrels, from excessive expansion, often requiring the addition of external reinforcement, such as ferrules or the like. A major problem with joints in wooden calls is the tendency for expansion and contraction of the wood and resulting loosening of parts.

Exterior surfaces of some past made calls have been painted, often dull or camouflage colors, for the purpose of protecting the material and reducing the chance an animal or bird would see it. It would be an improvement to incorporate multiple colors into the barrel wall. This is particularly true in calls with flared open ends which have a tendency to reflect considerable light.

SUMMARY OF THE INVENTION

This invention resides in a new and improved game call to be used for attracting birds and animals. It is of a generally tubular appearance, open at both ends, and contains a vibratory reed.

The main body of the call is preferably constructed of two parts, but this invention is not limited thereto. The call is held in the hand of the user by the larger of its two parts, the barrel. The second body part is herein referred to as a voice-unit, as it is associated with the vibratory reed. Depending on orientation of the reed and the sounds desired, either the barrel or voice-unit end may serve as a mouthpiece.

The barrel is constructed of soft, resilient material, preferably of rubber, although relatively resilient plastic or other synthetic material may be used. Advantages provided by such a barrel are; weather-resistance, a relatively non-reflective surface, reduction in noise should it come in contact with another object, and elimination of need for paint, exterior covers, or the like. It further provides a warmer, more comfortable surface to hold. The barrel provides for compression to alter the shape of it's mouthpiece end, providing a better fit and reducing potential damage to the user.

The barrel of the call has a plurality of soft, flexible longitudinal ribs, spaced both circumferencially and longitudinally to its axis, of a material homogeneous to that of the barrel. Protruding outward from the barrel surface, the ribs reduce the amount of light reaching and reflected off the barrel. They provide an improved, more comfortable gripping surface. In addition, the ribs can be compressed by the users fingers, to further improve grip and reduce possibility of the call slipping from users hand. Spacing and arrangement of ribs provide for an additional improved means by which to grip the call. In addition to the noise reducing characteristics of the general barrel surface, the ribs provide for a smaller, and more flexible surface area to come in contact with other objects, further reducing possibility of noise.

The barrel is multi-colored, with coloring incorporated into a material homogeneous to that of the barrel and ribs, providing a camouflage appearance both internally and externally. This improvement eliminates the need for colored external covers, paint or the like, and reduces the possibility of alerting or spooking an approaching animal.

The voice-unit is constructed of a relatively rigid material, preferably plastic. The voice-unit provides for reed securement and/or a suitable surface for the reed to vibrate against in order to produce desired sounds.

In the call of the present invention, the soft resilient barrel, interacting with the rigid voice-unit, provides for a novel means for securing the two parts in axial alignment, securing a vibratory reed to the voice-unit and also provides for ease of assembly, disassembly and access to vibratory reed assemblies.

The primary object of the present invention is to provide an improved calling device that is rugged, durable, weather resistant, and easier to operate and maintain.

A further object of this invention is to provide such a call with an improved means for securing tubular body parts and for ease of assembly, disassembly and access to internal parts.

Still another object of this invention is to provide the barrel of such a call with a plurality of resilient, longitudinal ribs, spaced both circumferentially and axially to the barrel making is easier and more comfortable to hold.

A further object of this invention is to provide an improved means for coloring of all interior and exterior surfaces of the call barrel.

Yet another object of this invention is to provide a barrel, with resilient internal shoulders that can be altered in shape by external pressure, resulting in a call of improved timber.

Various changes and modifications may be made within this invention as will be apparent to those skilled in the art. Such changes and modifications are within the scope and teaching of this invention as described in the herewithin claims.

For the purpose of illustration of this invention, preferred embodiments thereof are shown in the accompanying drawing. It is to be understood that the drawing is for the purpose of description only and that the invention is not limited thereto.

With the above and other objects and advantages visible in the accompanying drawings and detailed descriptions, the nature of the invention will be more clearly understood.

BRIEF DESCRIPTION OF THE DRAWINGS

FIG. 4 is a perspective mouthpiece end view of barrel end of the

FIG. 1 game call, illustrating altered shape resulting from external compression;

FIG. 8 is a perspective view of a vibratory reed assembly of the game call of FIG. 7;

FIG. 9 is a longitudinal cross sectional view of the assembled call of FIG. 7, without reed assembly of FIG. 8;

FIG. 10 is a perspective view of the voice-unit of the FIG. 7 call;

FIG. 11 is a perspective view of a voice-unit cap;

FIG. 12 is a perspective view of an alternate voice-unit cap;

FIG. 13 is a perspective view of an alternate reed voice assembly;

DESCRIPTIONS OF PREFERRED EMBODIMENTS

Figure 1:
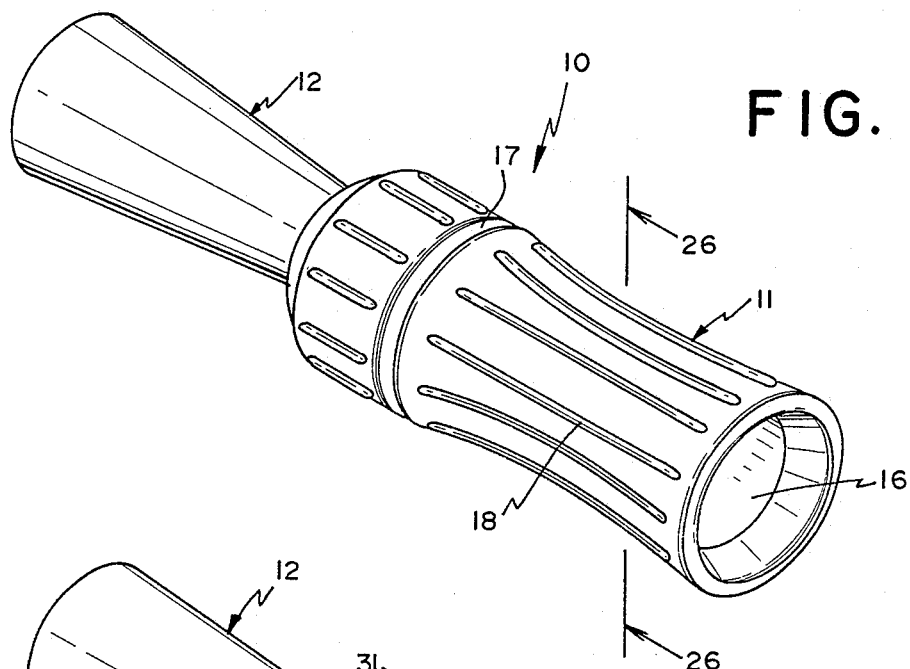
FIG. 1 is a perspective view of the first embodiment of a game call of the present invention.
Figure 2:
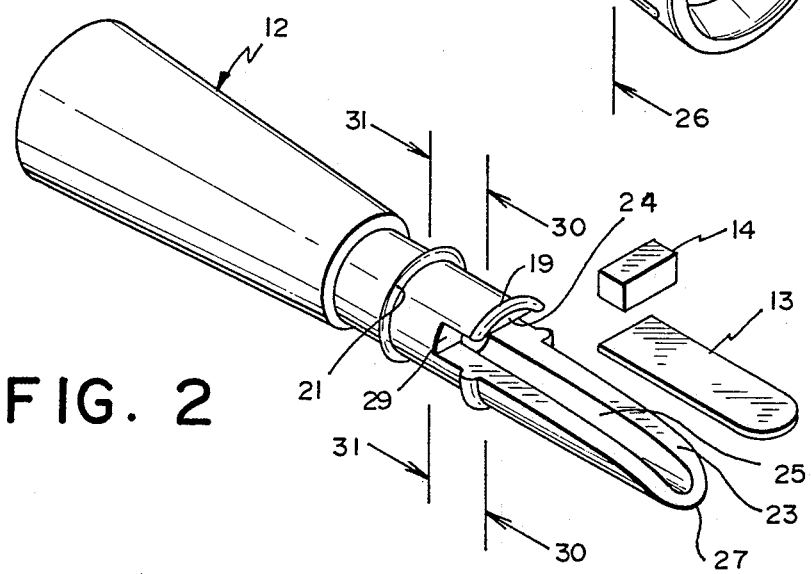
FIG. 2 is a perspective view of a voice-unit of FIG. 1 game call.
Figure 3:
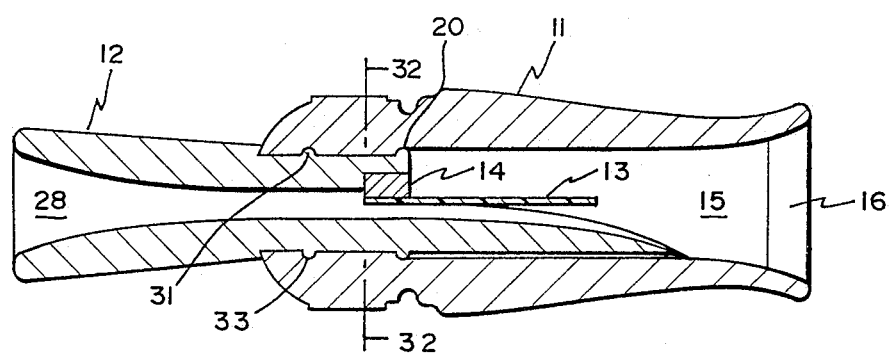
FIG. 3 is a longitudinal cross sectional view of FIG. 1 game call.

The first embodiment of the present invention is shown in FIG. 1. Generally designed to produce the sounds of various waterfowl, but may be modified to be used for calling other birds and animals. The call 10 consists of two main tubular parts aligned axially, namely a barrel 11 serving as a mouthpiece, and a voice-unit 12 providing a sound exit end. The voice-unit 12 includes, as can be seen in FIGS. 2 and 3, a vibratory reed 13 and a resilient reed retainer 14. The bore 15, FIG. 3, of the barrel 11 is continuous with the bore 28 of the voice-unit 12, and the call 10 is open at both ends.

Figure 5:
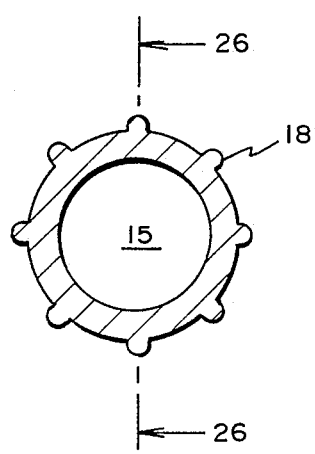
FIG. 5 is a transverse cross sectional 26—26 view of the mid portion of the game call barrel of FIG. 1, depicting projecting ribs.

As shown in FIGS. 1 and 5, the barrel is generally cylindrical. It is constructed of a relatively soft, resilient material, preferably rubber or similar relatively non-reflective, resilient natural or synthetic material. The resilient material generally provides for a warmer, more comfortable, non-slip griping surface.

The exterior of the barrel 11 is slightly concave at its mid portion, providing for a comfortable grip by the hand of the user. A circular groove 17, on the barrel 11, is provided for securing the call to a lanyard.

As shown in FIGS. 1, the exterior of the barrel is provided with a plurality of raised longitudinal ribs 18, spaced both circumferencially, 26—26 FIG. 5, and longitudinally to the axis of the barrel 11. The ribs 18 are of a flexible material homogeneous to that of the barrel 11. The ribs 18 extend generally the entire length of the barrel 11, but are interrupted adjacent to the lanyard groove 17. The ends of the ribs 18 adjacent to the lanyard groove 17, in conjunction with the resilient material of the barrel 11, provide an improved griping surface. It further provides an improved surface to secure a lanyard to the call. This greatly reduces the possibility the call 10 may slip loose from a lanyard and be lost, should it be brushed against or snagged on a branch, bush or other object. This has been a common problem in many past made game calls.

The ribs 18, offering a flexible griping surface, and can be compressed by the hands and/or fingers of the user to provide additional grip. This is particularly important and helpful to those using the calls in cold and/or wet weather.

Light reflecting off shiny game call surfaces often alerts nearby animals and birds and is a problem to those who use such calls. By projecting above the barrel 11 surface, the ribs 18 provide for blocking and reducing the amount of light reaching and reflected off the barrel 11. This reduction of reflected light will provide a definite advantage to those using the call 10.

It is common for a user to carry several calls during an outing. These calls are generally secured to the neck of the user by lanyards so that they hang together, against the users chest. Carried in-this manner, they frequently bump against each other, producing a loud, clacking noise. This troublesome noise frequently alerts and spooks nearby animals and birds, and is well known to those experienced using game calls. Another major advantage provided by the call 10 of the present invention relates to a reduction of the aforedescribed, and other undesirable, noise. The barrel 11 provides a soft, resilient surface for contact with other objects. The ribs 18, of the same soft material, reduce the potential contact surface area of the barrel 11. In combination, these two attributes of the present invention significantly reduce the possibility of audible noise should the call come in contact with another call or other object. This improvement will be appreciated by those who use the improved call 10 of the present invention.

Figure 4:
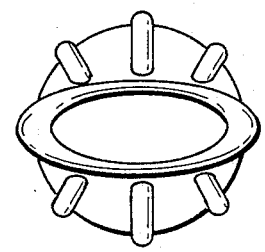

The generally cylindrical bore 15 of the barrel 11 flares outwardly at its mouthpiece end 16 providing both a comfortable surface, and reduction in the potential of damage to the users mouth. Further, the barrel 11 can be compressed at its mouthpiece end 16, as shown in the end view FIG. 4, to provide a comfortable fit to the users mouth. The straight mid portion of the bore 15 provides clearance for the vibrating reed 13. The bore 15 has an internal shoulder 20 described in detail hereinafter, as can be seen in FIG. 3, and reduced diameter generally at its voice-unit end, providing for engagement of the voice-unit 12 to the barrel 11.

The barrel 11 and ribs 18 are of a multi-colored homogeneous material providing coloration to both internal and external surfaces. This improvement eliminates the need for colored external covers, paint or the like. Thereby reducing labor, parts and materials. Further, this multi-coloring reduces reflected light off external and visible internal surfaces, particularly the flared end 16, and provides a camouflage effect which reduces the possibility a bird or animal will see it. It is generally accepted that this is important to the success of calling birds or animals.

The voice-unit 12, as shown in FIGS. 1–3, is a generally cylindrical, tubular part of the call 10, axially aligned to the aforedescribed barrel 11. The voice-unit 12 is constructed from a relatively rigid material, preferably of plastic, but could also be constructed of wood, rubber or other synthetic material.

The voice unit 12 is flared toward its sound exit end, on both its internal and external surfaces, providing for increased volume.

The external and internal surfaces of the mid portion of the voice-unit 12 are generally straight and cylindrical. The external surface of the mid-portion of the voice-unit 12 is provided with a raised circular rib 21, and two raised semi-circular ribs 19, as will be described in greater detail hereinafter.

The barrel, or reed trough, end 27 of the voice unit 12 is notched, longitudinally to the call 10 axis, providing an outwardly curving surface 23, for the reed 13 to vibrate against, and a transverse vertical surface 24. The flat surface 23 of the voice-unit 12, includes a centrally located, axially aligned, longitudinal groove 25, continuing from the bore 28 of the voice-unit 12, and terminating adjacent to, but slightly short of the barrel end 27 of the voice-unit 12. The transverse vertical surface 24 includes a slot 29 for accepting the reed retainer 14 used to secure the vibrating reed 13 to the voice-unit 12. The elongated, planar reed 13 is constructed of a relatively flexible plastic material, approximately 0.020" thick, however, other suitable vibratory material may be used. The retainer 14, is constructed of cork, rubber or other similarly yieldable material.

Now again referring to the barrel 11 and the voice-unit 12, as shown in FIGS. 2 and 3. The soft, resilient material of the barrel 11 interacting with the rigid structure of the voice-unit 12 provides for an improved means for securing two tubular game call parts together. The mid portion of the voice-unit 12 has an O.D. 30—30, of approximately 0.005" larger, and a raised circular rib 21 with an O.D. 31—31 approximately 0.025" larger than the I.D. 32—32 of the bore 15 of the barrel 11, providing an oversized-fit between the two parts. Resilience of the barrel 11 allows the rigid oversized voice-unit 12, to be easily pressed by hand, or force-fitted, into the bore 15 of the barrel 11, for assembly of the call. Disassembly is easily accomplished by reversing the procedure and extracting or pulling the voice-unit 12 from the barrel 11. Thus, providing easy access to the vibratory reed 13 for cleaning, tuning or repair.

The rib 21 provides constant, radially directed, outward pressure on the interior surface of the barrel 11 resulting in compression and a temporary indentation 33, FIG. 3. Resilience of the barrel 11 provides relatively constant, radially directed, inward pressure on the mid portion of the voice-unit 12. This combination results in a secure, air-tight fit between the two parts. The outside diameter 31—31 of the rib 21 additionally compensates for compression-set of the barrel material, therefore maintaining a secure fit over an extended period of time, eliminating the problem of parts becoming loose as in prior art game calls.

The two semi-circular ribs 19, located on opposite sides of the mid portion of the voice-unit 12 have an O.D. equivalent to that of rib 21, but do not engage or compress the surface of the bore 15, as aforedescribed in rib 21, except during assembly and disassembly. However, they interact with the resilient, transverse surface of the shoulder 20 within the bore 15 of the barrel 11 providing a secure "locking" fit between the voice-unit 12 and barrel 11.

This improvement, in the call 10 of the present invention eliminates the need for screw threads, "0" rings, tapered press or friction-fit unions, as commonly found in past made game calls. Providing a further advantage, it eliminates the potential of barrel cracking due to overexpansion, which frequently occurs in game call barrels constructed of rigid materials. Still further, it eliminates the need to provide additional external means to secure the two parts and/or reinforce the barrel, such as ferrules, rubber sleeves or the like. These benefits will be appreciated by both those who make and use the call 10.

Figures 6, 7:
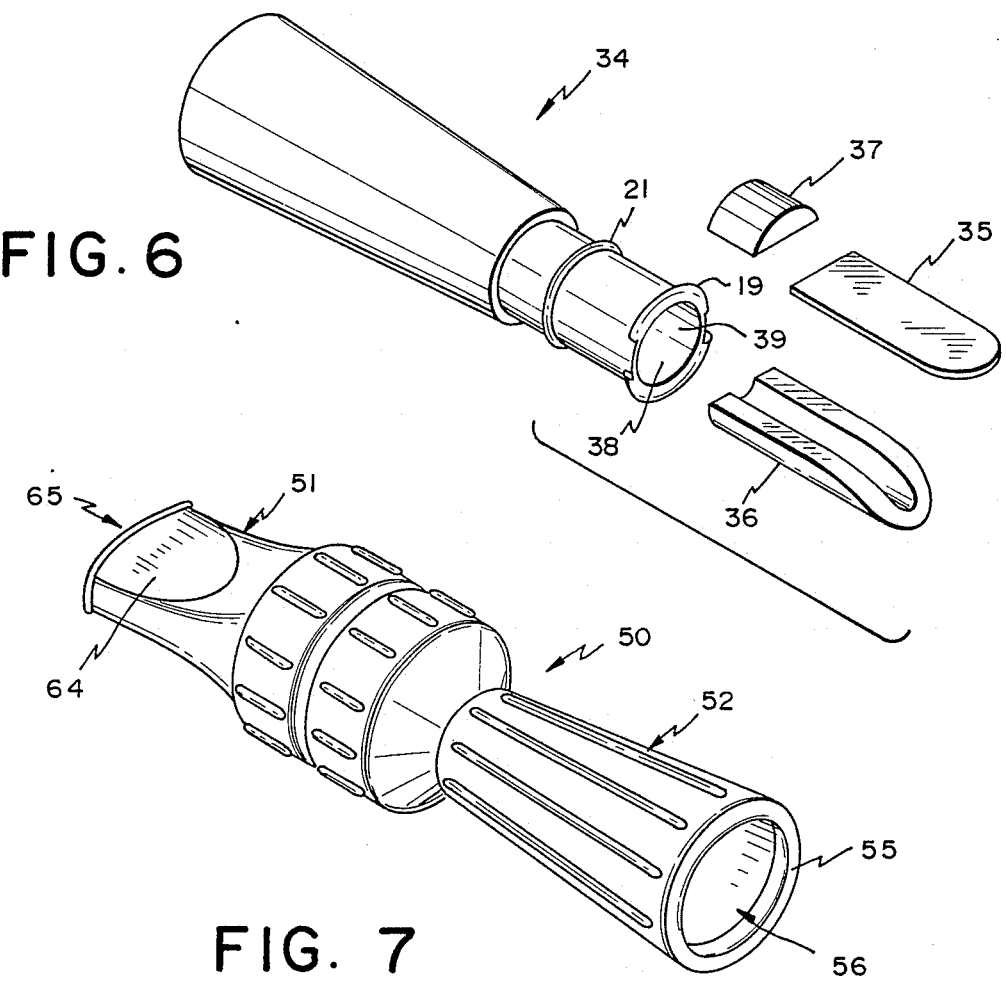
FIG. 6 is a perspective view of an alternative voice-unit of the game call of FIG. 1.
FIG. 7 is a perspective view of the second embodiment of the present invention.

A modification of the aforedescribed voice-unit 12, is shown in FIG. 6. The voice-unit 34 is constructed in all respects the same as the aforedescribed voice-unit 12, but as a part separate from the reed 35, reed trough 36 and retainer 37. In addition, the central bore 38 has been enlarged and slightly flared at its end 39 to accept the reed 35, reed trough 36 and reed retainer 37, which are wedged into the bore 39 during assembly. This alternative voice-unit 3 provides for interchanging of parts for production of different animal or bird sounds.

FIG. 7 shows a second embodiment of the present invention. The game call 50 of this embodiment consists of two main tubular body parts, namely a voice-unit 51, and a barrel 52. In this embodiment, the voice-unit 51 serves as a mouthpiece and the barrel 52 provides for sound-exit. Also differing from the first embodiment, as shown in FIG. 8, is the vibrating reed assembly 38, as previously shown and described in U.S. Pat. No. 2,929,280 to Wintress.

Referring to FIGS. 7 and 9, the bore 54 of the barrel 52 and the bore 48 of the voice-unit 51 are generally cylindrical, axially aligned and the call 50 is open at both ends. The call 50 of this embodiment is suitable for producing a wide variety of sounds suitable for attracting many different types of birds and animals.

The barrel 52 is in all respects identical to the barrel 11 of the first embodiment, but the external and internal shape have been modified.

The exterior surface of the barrel 52 is generally cylindrical, but flaring towards its sound-exit end 56, and with its narrowest diameter generally at its mid portion providing the user a comfortable grip. The ribs, similar to call 10, extend generally from one end of the barrel 52 to the opposite end, however, they are interrupted at the mid portion of the barrel 52 and again adjacent to the lanyard groove.

The bore 54 of the barrel 52 is generally cylindrical, but characterized by four distinct shoulders. Beginning at the sound-exit end 56 of the barrel 52, the interior edge is tapered 55. Towards the mid section of the bore 54 there are two shoulders 57, 58 reducing interior diameter and providing for an increase in volume and a more desirable sound. Further, the resilience of the barrel material provides the user the option of altering the shape of the internal shoulders by pressure applying pressure externally by the hand of the user, and thereby varying the sounds produced. It is believed that this improvement, and the resilient material of the barrel, which more closely matches the resilience of the throat of an animal or bird than rigidly constructed call barrels of past art game calls, provides the user with a call of improved and variable timber.

The third and fourth shoulders 59, 60 provide for internal dimensions generally corresponding to the external dimensions of the barrel end portion of the assembled voice-unit 51.

The shoulder 60 on the bore 54 of the call barrel 52 provides for insertion of the voice-unit 67, at its largest diameter, slightly into the bore 54. This provides, in the assembled call, for the elimination of an exposed transverse joint that could possibly be snagged on grass or brush, or become clogged with dirt or other debris.

Figure 14:
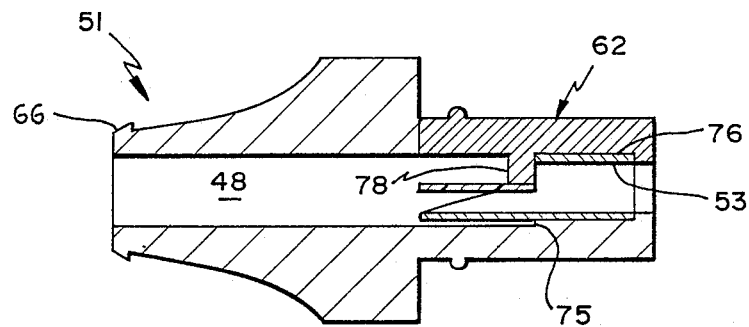
FIG. 14 is a longitudinal cross sectional view of the assembled voice-unit of the call of FIG. 7, including reed voice assembly 53 of FIG. 8 and cap 62 of FIG. 11.
Figure 15:
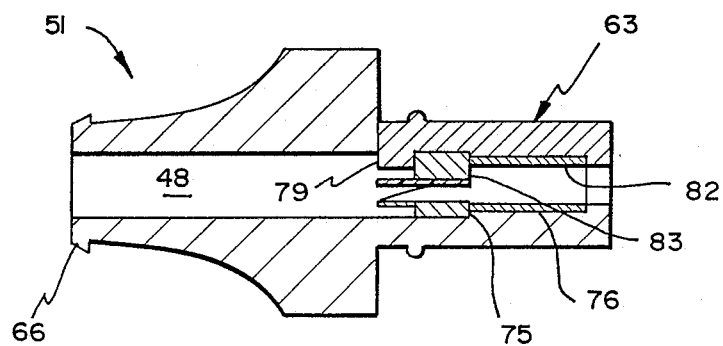
FIG. 15 is a longitudinal cross sectional view of the assembled voice-unit of the call of FIG. 7 fitted with the alternate cap 63 of FIG. 12 and reed voice assembly 82 of FIG. 13.

The voice-unit 51, preferably constructed of, but not limited to, plastic and shown in FIG. 10, has a centrally located, generally cylindrical bore 48 continuous with the bore 54 of the barrel 52 in the assembled call 50. The exterior of the assembled voice-unit 51, shown in FIGS. 9,14 and 15, is generally cylindrical at its barrel end portion, and stepped and wider at its mid portion. From its mid portion, the upper and lower external surfaces of the voice-unit 51 converge toward the axis of the call 50 to provide a relatively flat, but concave, surface 64 at its mouthpiece end 41, providing a comfortable fit to the users mouth. The voice-unit 51 has a raised transverse ridge 66, located on both its upper and lower surfaces 64 at its end portion, providing the user a means to hold the call by the teeth preventing it from slipping from users mouth.

Now again referring to the voice-unit 51, as shown in FIG. 14. The voice-unit 51 is constructed so that the top cap 62 can be lifted from the voice-unit 51, providing direct access to the bore 48 of the voice-unit 51 for inserting the reed assembly 53 during assembly of the call 50, or for cleaning, tuning or reed replacement.

As shown in FIGS. 10—12, two longitudinal ridges 68, on the flat surface 70 of the voice-unit 51, correspond to two notches 67 on the cap 62. These ridges and notches provide for an interconnecting, correctly aligned fit between said parts when positioned facing one another with their, generally flat surfaces in opposition. The ridges 68 and notches 67 prevent axial movement of the cap 62 during insertion and extraction of the assembled voice-unit 51 from the barrel 50.

The cap 62 and the voice-unit 51 have centrally positioned, semi-circular, longitudinal grooves 77, located axially on their flat surfaces 70, of a radius matching the radius of voice-unit bore 48, providing for a bore of generally consistent diameter throughout the assembled voice-unit 51. However, as shown in FIGS. 9,14 and 15, a shoulder 75 on the bore of the assembled voice-unit 51 provides for a reduced diameter to secure the reed assembly within the bore. The bore 48 at its reduced portion 76 has a diameter of approximately 0.010" smaller than the outside diameter of the reed assembly 53, providing for an interference fit. This interference fit provides to secure the reed assembly 53 within the bore 48 and prevent air, blown through the call, from passing around the exterior of the reed assembly 53.

The voice-unit 51 is provided with a raised semi-circular ridge 71 at the end of its central groove, which corresponds to a similar ridge on the cap 62. These ridges form an internal shoulder in the bore 48 of the assembled voice-unit 51, restricting axial movement of the reed assembly 53 towards the barrel 52 end of the call 50.

The central groove 76 of the cap 62 is divided by a raised ridge 78 projecting transversely across, and dividing said groove. When the cap 62, reed assembly 68 and the voice-unit 51 are assembled, the ridge 78 prevents axial rotation of the reed assembly 53 within the bore 48 and further prevents movement of the reed assembly 53 toward the mouthpiece end 65 of the call 50.

The voice unit 51 is provided with a raised semi-circular rib 80 on its external surface corresponding to a similar rib 81 on the cap 62. Ends of these ribs 80,81 come into opposition during assembly of the voice-unit 51 resulting in a relatively continuous rib around the voice-unit 51 and cap 62. Said rib functions in cooperation with the resilient barrel 52 to provide a secure fit between the voice-unit 51 and barrel 52 in a manner as aforedescribed in call 10 and shown in the first embodiment of the invention in FIG. 3.

Semi-circular notches 69 on opposite sides of the voice-unit 51 provide for a gripping edge and easy removal of the cap 62 from said voice-unit by the fingers of the user.

In the present embodiment of the invention, the resilient barrel 52 incorporates the added functions of (1) providing inwardly directed radial pressure on two parts 51,62 of the assembled voice unit 51 providing a means to secure said parts in opposition (2) providing a means for compressing and securing the oversized reed assembly 53 within the voice-unit 51 bore 48 and (3) providing the user an opportunity to alter sounds produced by applying external pressure to the barrel, thus compressing and altering the shape of the internal bore and shoulders.

FIG. 13 shows an alternative vibratory reed assembly 82 for call 50. This reed assembly is in all respects identical to that of FIG. 8, however, it is provided with a plastic ring 83 fitted over its mid section which functions to restrict movement of the vibratory reed and alter the sounds produced.

FIG. 12 shows an alternative cap 63 for voice-unit 51. This cap 63 is in all respects identical to cap 62 of FIG. 11, however, it has been modified to accept the alternative vibratory reed assembly 82 of FIG. 13, thereby providing both those who make and use the call the an option of interchanging the two different reed voice assemblies 53,82. As can be seen in the drawing, the transverse ridge 79 within the central groove of the cap 63, is located at end of the groove, generally providing the same function as rib 78 aforedescribed in cap 62.

FIG. 14 shows a longitudinal cross sectional view of the voice-unit 51 with cap 62 securing reed assembly 53. FIG. 15 shows a corresponding view of the voice-unit 51 with cap 63 securing reed assembly 82.

It will be understood that numerous modifications and substitutions can be had to the aforedescribed embodiments without departing from the spirit of the invention. For example, an alternative to the two-part tubular body, as aforedescribed, in call 50, and shown in FIG. 7, is to construct the main body of one part with a generally cylindrical central bore. Additional advantages of this method of construction is a reduction in parts and a resilient mouthpiece, providing additional comfort to the users mouth. A tapered, internal bore at the mouthpiece end of the call can be provided to accept the reed assembly 53, which can be inserted from the mouthpiece end and held securely in place by the resilience of the internal bore of said mouthpiece.

While the specific embodiments of the present invention have been shown and described in detail, it will be understood that the invention may be modified without departing from the spirit of the inventive principles as set forth in the hereafter claims.

I claim:

1. A game call comprising at least two tubular parts, namely a barrel and a voice unit, each open at both ends, said call including a vibratory reed, said voice unit providing a sound exit end and an engagement rib around said voice unit, said barrel serving as a mouthpiece, said barrel being constructed of resilient material and having an inner groove, said barrel having an axis with a plurality of flexible, longitudinal ribs spaced circumferentially around a barrel external surface generally parallel to the axis of said barrel, whereby said barrel accepts said voice unit in an interference fit with the groove engaging the engagement rib.

2. The game call of claim 1 wherein the material of said barrel is multi-colored, providing a camouflage appearance eliminating the need for painting or prior art external covers.

3. The game call of claim 1 wherein said voice-unit is constructed of a rigid material permitting said reed securement as well as a surface for the reed to vibrate against in order to provide desired sounds.

4. The game call of claim 1 wherein said barrel interacts with said rigid voice-unit, securing the two parts in axial alignment permitting ease of assembly, disassembly and ready access to said vibratory reed.

5. The game call of claim 1 wherein the mouthpiece end of said barrel which is being claimed may be compressed by the hand of the user to provide a better, more comfortable fit to the mouth of the user.

6. A game call comprising two tubular parts, namely a barrel and a voice-unit, said call being open at both ends and containing a vibratory reed, said barrel serving as a mouthpiece and said voice-unit providing a sound exit end and an engagement rib, said barrel being made of flexible material having an inner engagement groove, said barrel provided with an axis and a plurality of flexible, longitudinal ribs spaced circumferentially around a barrel external surface generally parallel to said axis, whereby said barrel receives said voice-unit in an interference fit with the groove engaging the engagement rib.

7. The game call of claim 6 wherein said barrel has a bore and the bore of said barrel includes resilient shoulders.

8. The game call of claim 6 wherein the barrel has shoulders and dimensions of said shoulders can be altered by pressure exerted on exterior of barrel.

9. The game call of claim 6 wherein said voice-unit comprises at least two opposing parts securing said vibratory reed.

10. The game call of claim 6 wherein said voice-unit includes at lease one rib and one notch restricting movement of said parts when placed in opposition.

11. The game call of claim 6 wherein said voice-unit as a bore and interacts with said barrel securing said vibratory reed within the bore of said voice-unit.

12. The game call of claim 6 wherein as a bore and the bore of said voice-unit includes at least one shoulder limiting axial movement of said vibratory reed.

13. The game call of claim 6 wherein said voice-unit has a bore end bore of said voice-unit includes at least one transverse ridge limiting axial movement of said vibratory reed.

* * * * *